(12) United States Patent
Annavajjala

(10) Patent No.: US 9,509,455 B2
(45) Date of Patent: Nov. 29, 2016

(54) AUTONOMOUS CHANNEL QUALITY INFORMATION PREDICTION

(71) Applicant: Altiostar Networks, Inc., Tewksbury, MA (US)

(72) Inventor: Ramesh Annavajjala, Natick, MA (US)

(73) Assignee: AltioStar Networks, Inc., Tewksbury, MA (US)

( * ) Notice: Subject to any disclaimer, the term of this patent is extended or adjusted under 35 U.S.C. 154(b) by 154 days.

(21) Appl. No.: 14/264,892

(22) Filed: Apr. 29, 2014

(65) Prior Publication Data

US 2015/0312008 A1 Oct. 29, 2015

(51) Int. Cl.
*H04W 24/08* (2009.01)
*H04L 1/20* (2006.01)
*H04L 25/02* (2006.01)

(52) U.S. Cl.
CPC ............ *H04L 1/206* (2013.01); *H04L 25/022* (2013.01); *H04L 25/023* (2013.01); *H04L 25/0204* (2013.01); *H04L 25/025* (2013.01); *H04W 24/08* (2013.01)

(58) Field of Classification Search
None
See application file for complete search history.

(56) References Cited

U.S. PATENT DOCUMENTS

| 6,765,969 | B1 | 7/2004 | Vook et al. |
| 2007/0092012 | A1 | 4/2007 | Wilhelmsson et al. |
| 2011/0096680 | A1* | 4/2011 | Lindoff ............... H04L 25/022 370/252 |
| 2011/0194633 | A1 | 8/2011 | Zhang et al. |
| 2013/0089159 | A1* | 4/2013 | Liu ....................... H04B 7/024 375/267 |

* cited by examiner

*Primary Examiner* — Jason Mattis
*Assistant Examiner* — Teisha D Hall
(74) *Attorney, Agent, or Firm* — Mintz Levin Cohn Ferris Glovsky and Popeo, P.C.

(57) ABSTRACT

Data characterizing a first signal transmitted in an orthogonal frequency-division multiplexing (OFDM) system by a transmitter with one or more transmit antennas through an in-band channel and received by a receiver with a plurality of receive antennas can be received. The first signal can include one or more in-band pilot pulses. A channel quality for an out-of-band channel can be predicted based on the received data and a cross-correlation between an in-band channel and one or more out-of-band channels. Data characterizing the predicted channel quality for the out-of-band channel can be provided. Related apparatus, systems, techniques, and articles are also described.

18 Claims, 12 Drawing Sheets

Uplink allocation of a user in the PUSCH Mode

Uplink allocation of a user in the PUCCH Mode

Downlink allocation of a user distributed across the frequency band

The PUCCH format 1/1a/1b symbol and slot structure (normal CP)

Downlink resource block format using antenna port 0 (normal CP)

AUTONOMOUS CHANNEL QUALITY INFORMATION PREDICTION

TECHNICAL FIELD

The subject matter described herein relates to autonomous channel quality information prediction and generation for orthogonal frequency-division multiplexing (OFDM) and single-carrier frequency-division multiplexing (SC-FDMA) based air interfaces.

BACKGROUND

Wireless systems such as the ones based on the IEEE 802.11 standard for indoor local area communication, and the Third Generation Partnership Project (3GPP) based Long Term Evolution (LTE) for terrestrial cellular communication use multiple antennas for transmission and reception, both at an access point (e.g., base-station) and a user terminal (e.g., user equipment (UE)). These systems typically operate over a wider transmission bandwidth, use multiple-input and multiple-output (MIMO) technology, and employ broadband modulation formats such as OFDM and/or SC-FDMA. Since data processing can occur in the frequency-domain (unlike the time-domain data processing employed in Second Generation (2G), such as Global System for Mobile Communications (GSM), and Third Generation (3G), such as Wideband Code Division Multiple Access (WCDMA)), OFDM/SC-FDMA modulation schemes can convert a frequency-selective channel into multiple frequency-flat channels within the transmission bandwidth. The result is that, instead of complex channel estimation and equalization algorithms needed in time-domain, subcarrier-level frequency-flat nature of the OFDM/SC-FDMA modulations allows the receiver processing to be performed in frequency-domain.

Channel estimation may be performed by having a transmitter send known (or pilot) symbols to a receiver, which estimates the channel characteristics using the known symbols, and feeds back to the transmitter the estimated channel characteristics via a dedicated channel. The transmitter may then use the estimated channel characteristic, for example, in adaptive transmission techniques to improve bit rates. For example, the downlink reference signal received power (RSRP), reference signal received quality (RSRP) are the two well-known metrics the UE reports to eNodeB. Additionally, the UE transmits quantized downlink channel quality information (CQI) to eNodeB on periodic/aperiodic basis, either in the physical uplink shared channel (PUSCH) or physical uplink control channel (PUCCH). The CQI information in LTE systems can be sub-divided into wideband CQI, sub-band CQI, and UE-configurable sub-band CQI.

For UE with a single transmitting antenna, multiple antennas at the base-station (e.g., a single-input and multiple-output (SIMO) configuration) can be used to provide interference rejection capability. An example of spatial-division multiple access (SDMA) includes more than one UE transmits simultaneously to a base-station, and a base-station with multiple receiver antennas, which can jointly decode signals transmitted by the multiple UEs. This simultaneous transmission and joint detection technique can also be referred to as multi-user (MU) MIMO. In MU MIMO, each UE can have more than one transmitter antenna, and more than one transmission stream.

SUMMARY

In an aspect, data characterizing a first signal transmitted in an orthogonal frequency-division multiplexing (OFDM) system by a transmitter with one or more transmit antennas through an in-band channel and received by a receiver with a plurality of receive antennas can be received. The first signal can include one or more in-band pilot pulses. A channel quality for an out-of-band channel can be predicted based on the received data and a cross-correlation between an in-band channel and one or more out-of-band channels. Data characterizing the predicted channel quality for the out-of-band channel can be provided.

One or more of the following features can be included in any feasible combination. For example, the cross-correlation can be pre-computed using a predetermined channel model. The cross-correlation can be computed based on prior knowledge of a type of channel model associated with the out-of-band channel. The out-of-band channel can be within a usable transmission bandwidth. The cross-correlation can be characterized by a plurality of stored correlation coefficients, each correlation coefficient corresponding to an average of two or more subcarrier channel estimates. The channel quality can be predicted at least once per transmitter antenna. The channel quality can be predicted at a transmitter for transmission when the transmitter is in receive mode.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel. Such units include but are not limited to so-called "Graphics Processing Units (GPU)."

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

Like reference symbols in the various drawings indicate like elements.

DETAILED DESCRIPTION

Prediction of channel quality information (CQI) is described, which can be performed autonomously and can be used to predict instantaneous and average CQI for a channel that is outside a presently used frequency band. The CQI can be based at least on an autocorrelation of pilot tones received in the presently used band, and based on a cross-correlation between an estimate of a receive channel (e.g., using pilot tones received in the presently used band) and true channel characteristics characterized by previously computed correlation values or prior knowledge of channel type. Using the current subject matter, the CQI can be predicted autonomously using signals received at a transmitting node when it is in receive mode, thereby eliminating any need to feed back an estimated CQI from a receiving node via a dedicated channel to the transmitter.

Figure 1:
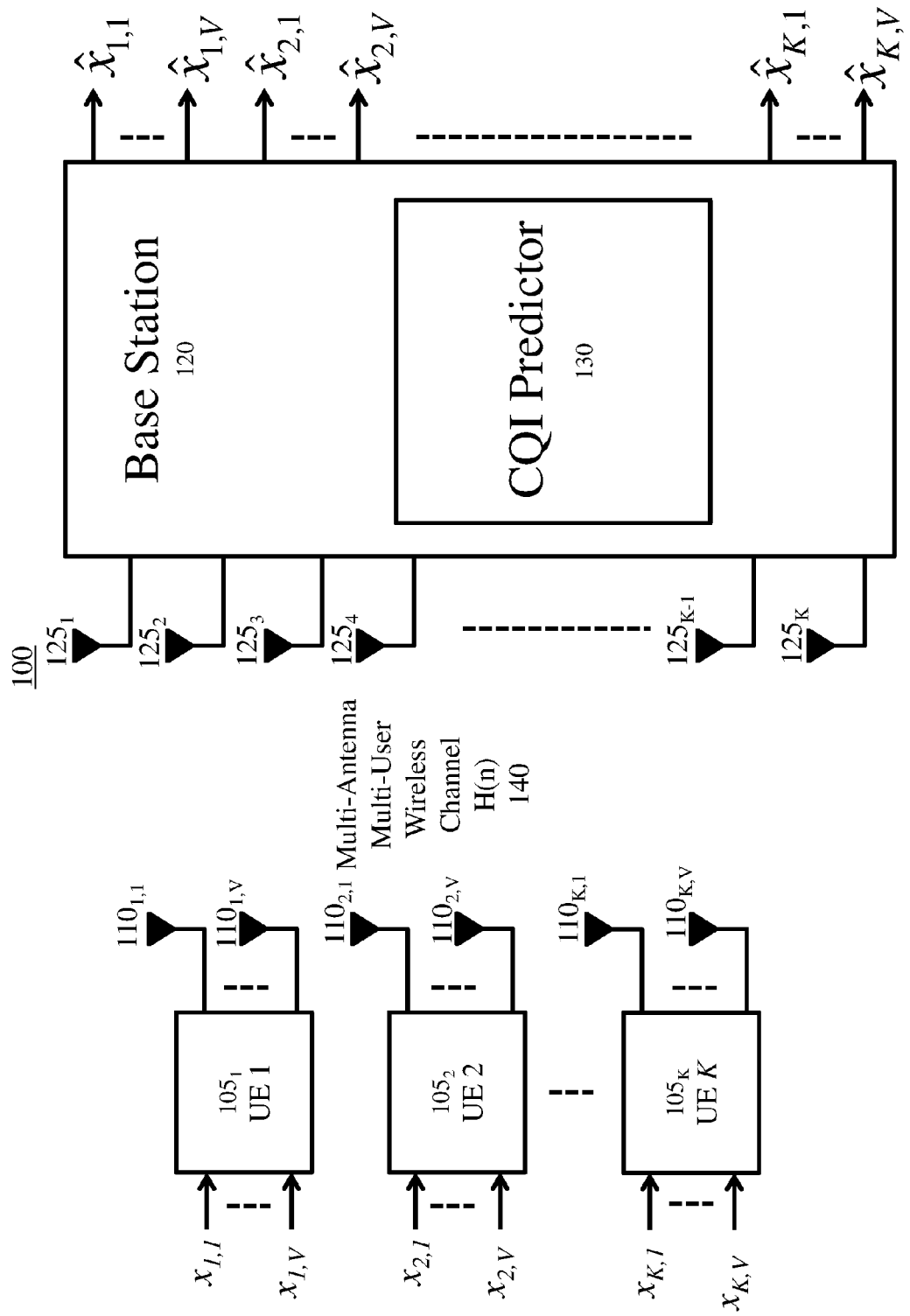
FIG. 1 is a system diagram illustrating an example Multi-UE Multi-stream spatial-division multiple access system with a channel quality information (CQI) predictor located at a base station.

Prediction of CQI can be implemented in a number of systems including at a base station or at user equipment (UE). For example, FIG. 1 is a system diagram illustrating an example Multi-UE Multi-stream spatial-division multiple access (SDMA) system 100 (or MU-MIMO) with a CQI predictor 130 located at a base station 120. The system 100 includes multiple UEs ($105_1, 105_2, \ldots, 105_K$), each having multiple transmit antennas ($110_{1,1}, 110_{1,2}, \ldots, 110_{1,\nu}$), which communicate with the base station 120 having multiple receive antennas ($125_1, 125_2, \ldots, 125_K$) via the wireless channel 140 (also denoted as H(n)). While FIG. 1 illustrates that the number of antennas on each UE 105 and the number of the antennas on the base station 120 are equal, the number of antennas on either the UE 105 and/or base station 120 can vary. In some example implementations, the number of streams per UE does not exceed the number of transmit antennas at that UE, and the total number of streams (summed across all the UEs) does not exceed the number of receive antennas at the base station.

Figure 2:
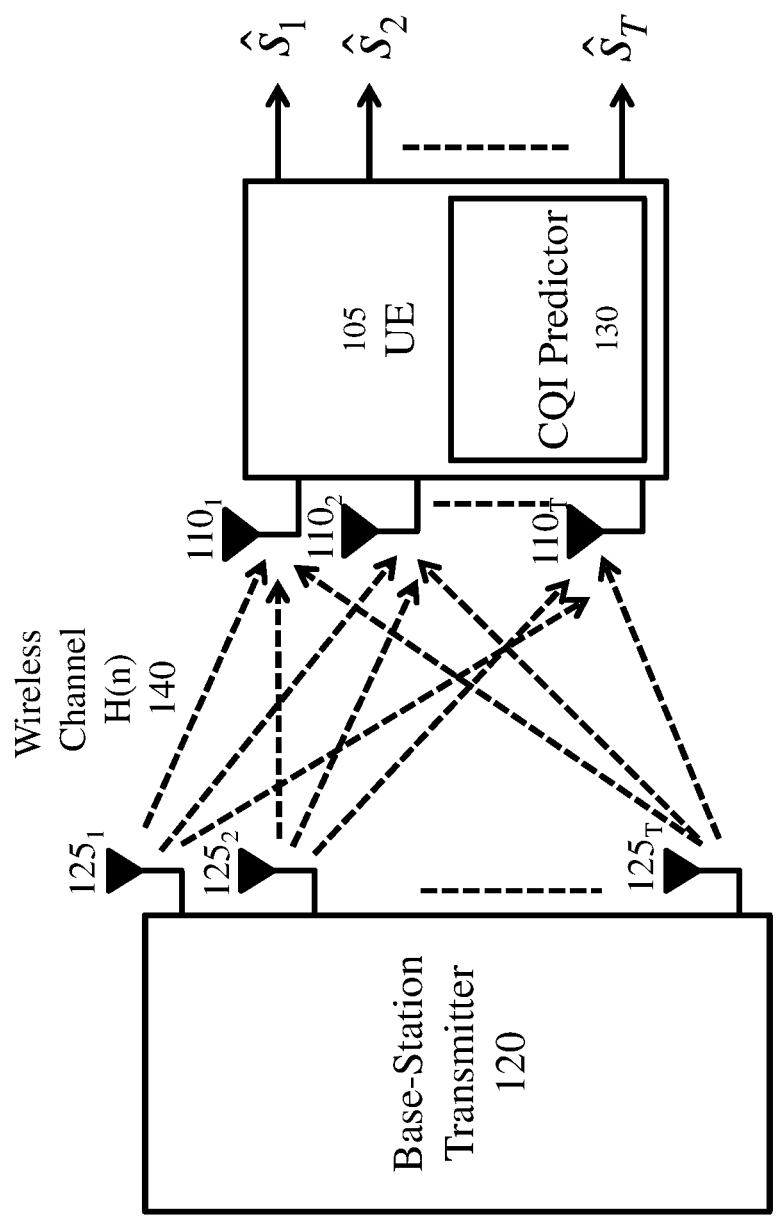
FIG. 2 is a system diagram illustrating a base station transmitter and a UE with a CQI Predictor.

As a second example, FIG. 2 is a system diagram illustrating a base station 120 transmitter and a UE 105 with a CQI Predictor 130. As described herein, the CQI Predictor 130 can operate either in the uplink or downlink.

Figure 3:
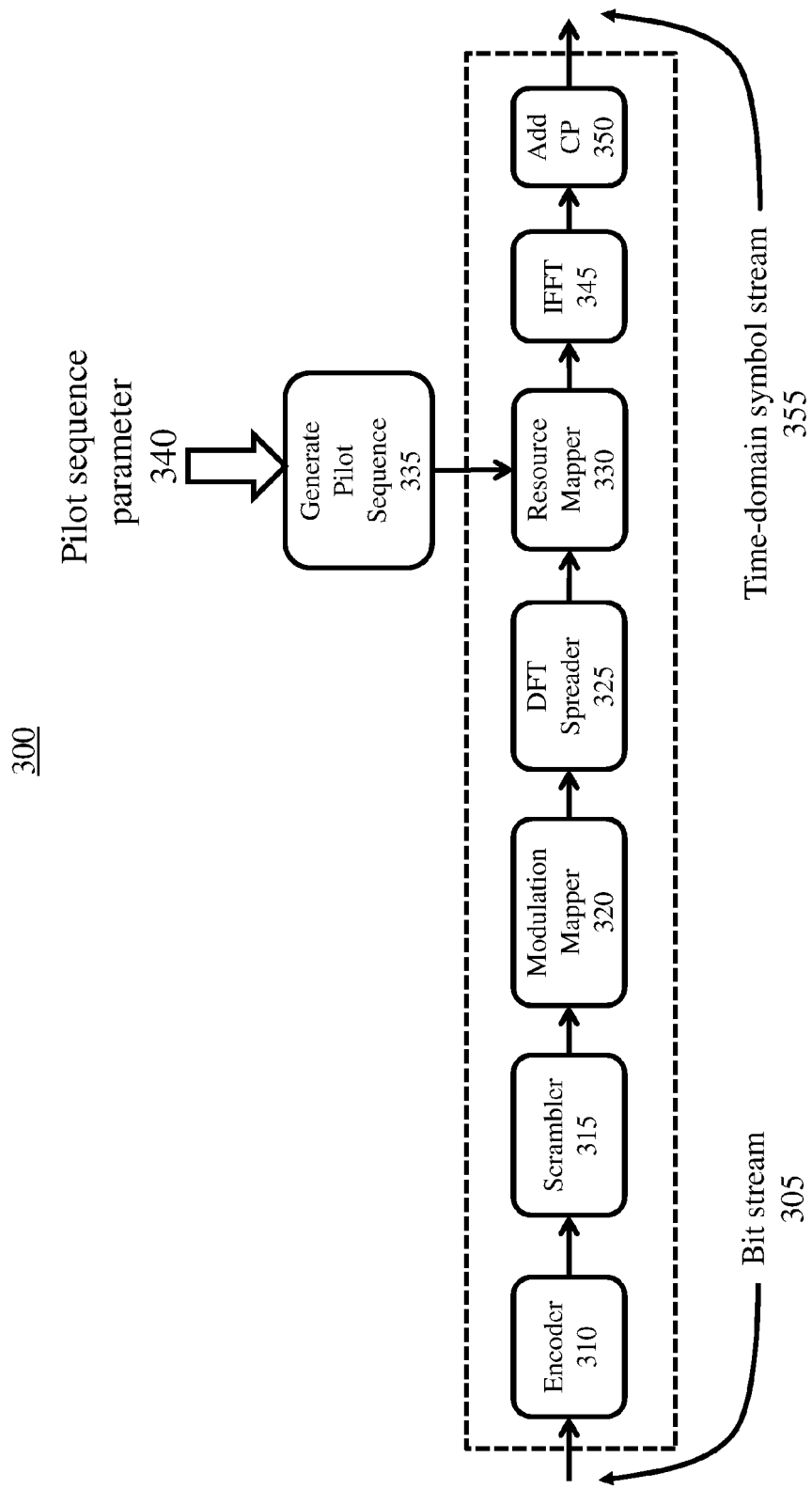
FIG. 3 is a functional block diagram of an example uplink transmitter signal chain within a UE for a single data stream (e.g., a single data stream of the system configured as shown in FIG. 1)

FIG. 3 is a functional block diagram of an example uplink transmitter signal chain 300 within a UE 105 for a single data stream (e.g., a single data stream of the system configured as shown in FIG. 1). An information bit stream 305 can be passed through an encoder block 310. The coded bit stream at the output of the encoder can be scrambled at 315, and the scrambled sequence can be modulation mapped at 320 using a constellation such as BPSK, QPSK, or any higher order constellation. To maintain low peak-to-average power ratio, the modulation symbols can be DFT precoded at 325. The precoded complex-valued symbols can be mapped to a set of resource elements (REs) at 330. One RE can be a frequency tone associated with an OFDM symbol (when DFT precoding is applied, the symbol can also be referred to as an SC-FDMA symbol). Separately, a pilot sequence can generated at 335 using pilot sequence parameters 340. Pilot symbols of the generated pilot sequence can be multiplexed with modulation symbols in the Resource Mapper 330 before applying an inverse FFT (IFFT) at 345 to convert the frequency-domain symbols into a time-domain symbol stream 355. To minimize the inter-symbol interference (ISI) caused by the channel frequency-selectivity, a cyclic prefix can be added to the OFDM/SC-FDMA symbol at 350. The length of CP can be larger than the maximum expected channel delay to reduce or eliminate the ISI completely. The time-domain symbol stream 355 can be further processed and transmitted over the wireless channel (H(n)) 140 to the base station 120.

Figure 4:
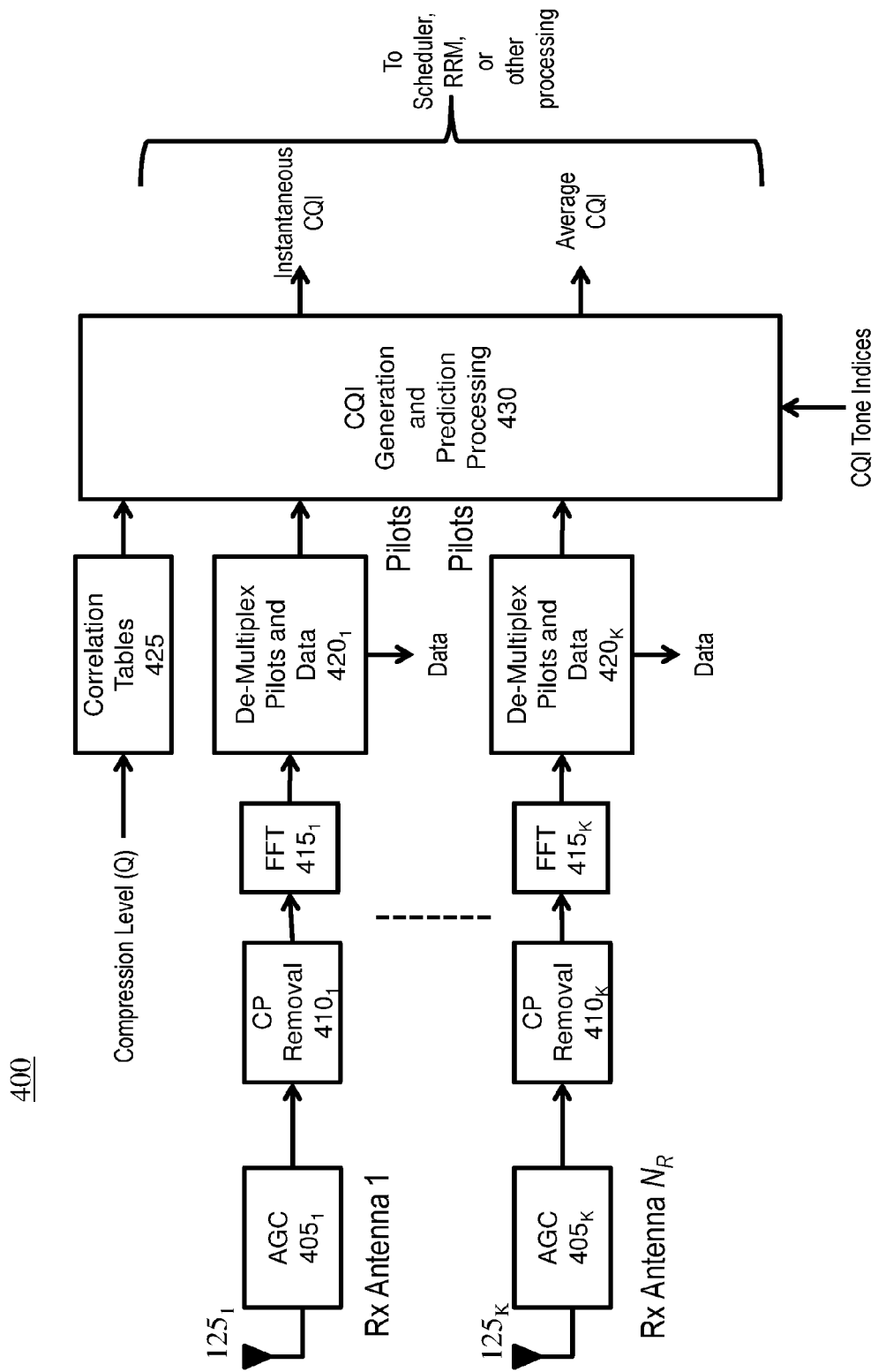
FIG. 4 is a functional system diagram of components of an example receiver with CQI Predictor for initial physical layer processing including CQI.

FIG. 4 is a functional system diagram 400 of components of an example receiver with CQI Predictor 130 (e.g., in a system configured as shown in FIG. 1) for initial physical layer processing including CQI. A transmitted signal, having traveled through the wireless channel 140 is received by one or more receive antennas ($125_1, \ldots, 125_K$).

At the example receiver with CQI Predictor 130, for each receiver antenna $125_i$ (where i=1, 2, ..., K), after performing down-conversion processing, automatic gain control (AGC) can be performed at $405_i$, CP removal can be performed at $410_i$, leaving OFDM or SC-FDMA symbols, which can be processed using an FFT at $415_i$ into the frequency domain. The effect of CP removal $410_i$, and FFT $415_i$ is that the linear convolution, in time-domain, of the transmitted signal with the channel response becomes frequency-domain multiplication of the transmitted signal with the channel response.

The pilot symbols, having been previously multiplexed with modulation symbols in the Resource Mapper 330, as shown in FIG. 3, can be de-multiplexed from the frequency domain data at $420_i$. The pilot pulses and de-multiplexed data can be provided for CQI generation and prediction at 430, which can receive correlation coefficients from correlation tables 425 and CQI tone indices (e.g., frequency indices) identifying desired tones for CQI to be predicted. CQI generation and prediction at 430 can predict the instantaneous and average CQI of a frequency band that is different from the frequency band of the received pilot pulses.

The instantaneous and average CQI can be used for additional processing. For example, if the CQI Predictor 130 is implemented at an eNodeB, the instantaneous and average CQI can be used by the Scheduler or the Radio Resource Management (RRM) unit for controlling MCS parameters, for controlling transmit power, and for MIMO mode adaptation of UEs the eNodeB serves. Other uses for the instantaneous and average CQI can be found.

With a single receiver antenna $125_1$, the time-varying and frequency-selective channel between the transmitter and the receiver can be described as $$h(t, \tau) = \sum_{l=1}^{L(t)} h_l(t)\delta(\tau - \tau_l(t))$$

where the variable t corresponds to time variations, the variable τ corresponds to the delay-domain, and the actual delay is denoted by $\tau_l(t)$. The delays are varying with time, therefore $\tau_l$ is a function of t. The number of multipath taps, L(t), and the channel gains, $h_l(t)$, are also time-varying. Channel coherence in time-domain can be defined as the time duration during which the delays $\tau_l(t)$, the number of paths L(t), and the channel gains $h_l(t)$ do not change with time. For systems such as 3GPP LTE, during one transmission time interval (or one sub-frame duration of 1 millisecond), the variation of the number of taps, the channel gains, and the tap locations as a function of time can be ignored, and the multipath channel can be described as, $$h(\tau) = \sum_{l=1}^{L} h_l \delta(\tau - \tau_l)$$

The frequency-domain representation of the above channel impulse response can be denoted by H(f), and is given by $$H(f) = \sum_{l=1}^{L} h_l e^{-j2\pi f \tau_l}$$

With pilot symbols inserted at frequency tones $f_1, f_2, \ldots, f_p$, where P is the number of pilot tones, the received frequency-domain signal is given by $$R(f_p) = S_p H(f_p) + W_p, p=1, 2, \ldots, P$$

where $S_p$ the p-th pilot symbol, and $W_p$ is the frequency-domain noise added on the p-th pilot symbol.

A least-squares channel estimate in the frequency-domain can be given by $$Z(f_p) = \frac{R(f_p)}{S_p} = H(f_P) + V_p, p = 1, 2, \ldots, P$$

In which $$V_p = \frac{W_p}{S_p}$$

can be defined as the effective noise.

Figure 8:
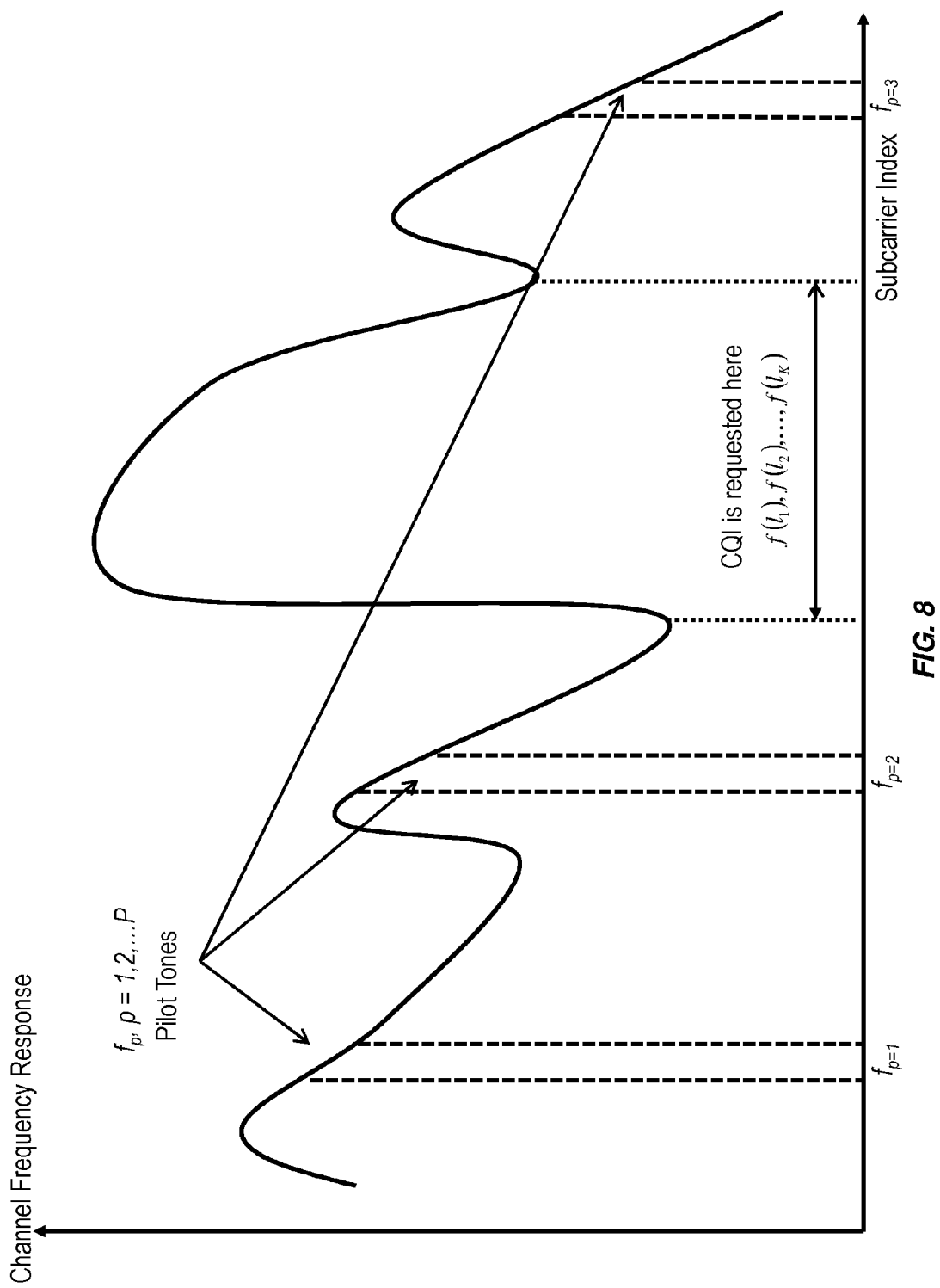
FIG. 8 illustrates channel frequency response as a function of subcarrier index.

Regarding CQI generation and prediction processing at 430, channel quality can be predicted over a sub-band represented by frequency tones $f(l_1), f(l_2), \ldots, f(l_K)$ where K is the number of tones within the sub-band. For example, FIG. 8 illustrates channel frequency response as a function of subcarrier index. Pilot tones may be received (e.g., $f_p$, p=1, 2, . . . P). But information relating to channel quality may be desired on different frequency bands (e.g., out-of-band frequencies), for example, $f(l_k)$ k=1, 2, . . . , K.

Figure 5:
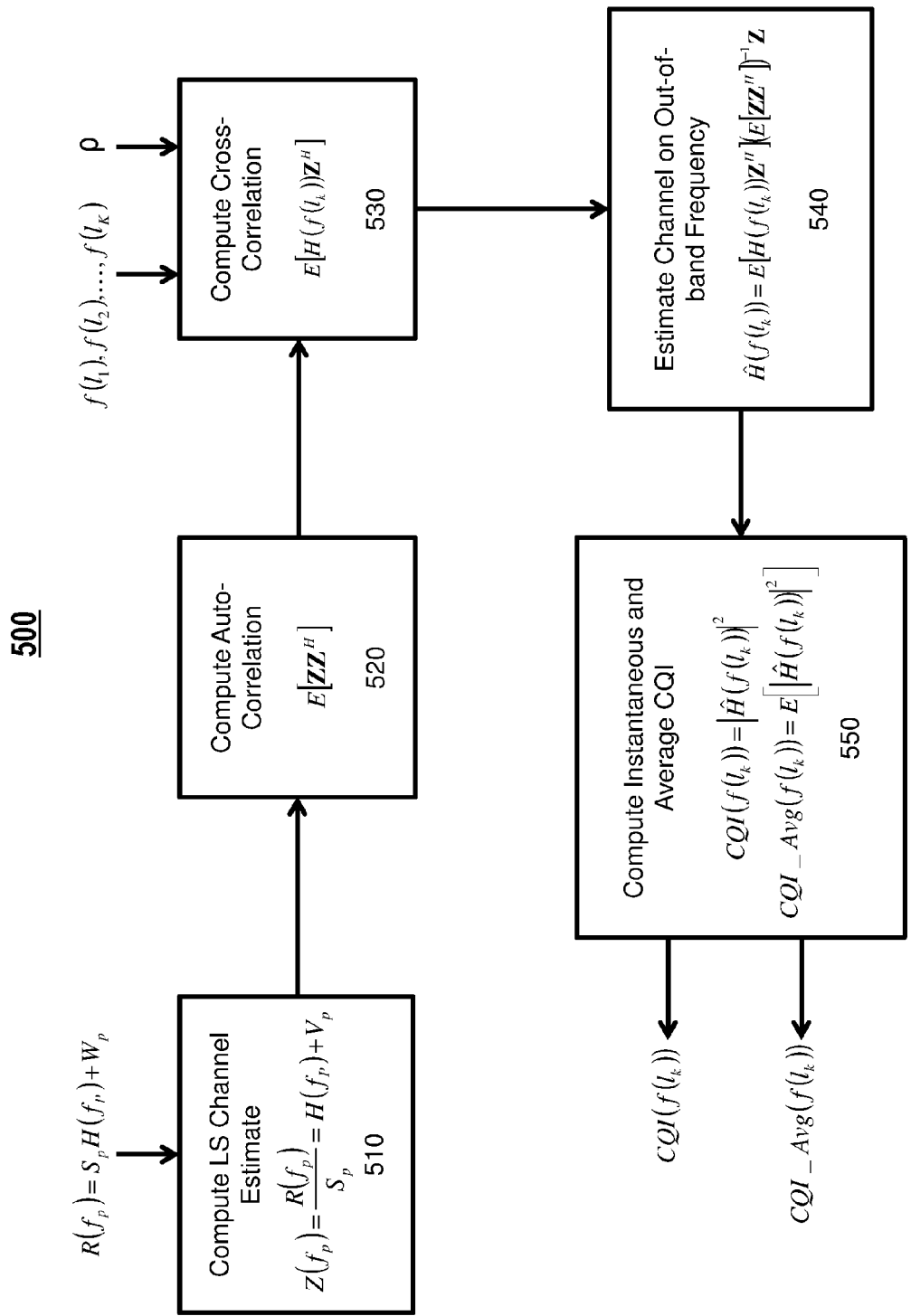
FIG. 5 is a functional block diagram illustrating a process to predict both instantaneous and average CQI on one or more frequencies that are out-of-band (e.g., different) from the frequencies of the received pilot pulses.

FIG. 5 is a functional block diagram illustrating a process 500 to predict both instantaneous and average CQI on one or more frequencies that are out-of-band (e.g., different) from the frequencies of the received pilot pulses. Some example implementations describe determining expectations of variables, the expectation can be determined using a number of different techniques, such as computing sample averages.

At 510, a least squares channel estimate $Z(f_p)$ can be computed using the received frequency-domain signal $R(f_p)$ as described above.

Focusing on the frequency tone $f(l_k)$, an estimate of the channel on $f(l_k)$ can be obtained as a linear combination of the frequency-domain least-squares channel estimates as $$\hat{H}(f(l_k)) = \sum_{p=1}^{P} w^*(f(l_k), p) Z(f_p)$$

$$= w^H(f(l_k)) Z$$

where $w(f(l_k)) = [w(f(l_k),1) \ldots w(f(l_k), P)]^T$, the superscripts *, T, and H denote the complex conjugate, transpose, and Hermitian operator, respectively.

A number of choices can be made in determining the optimum weight vector $w_{opt}(f(l_k))$. For example, the weights can be fixed irrespective of the channel conditions or the weights can be adaptively varied based on certain conditions on the channel or the allocation information (e.g., allocation localized or distributed, allocation size, and the like). But by choosing the prediction error vector $\hat{H}(f(l_k)) - w^H(f(l_k))Z$ statistically orthogonal to the observation vector Z, the optimum weight vector $w_{opt}(f(l_k))$ can be obtained as $$E[(\hat{H}(f(l_k)) - w^H(f(l_k))Z)Z^H] = 0 \Rightarrow w_{opt}^H(f(l_k)) = E[\hat{H}(f(l_k))Z^H](E[ZZ^H])^{-1}$$

Using the above derived optimum weight vector, the estimated channel on frequency tone $f(l_k)$ can be obtained as $$\hat{H}(f(l_k)) = w^H(f(l_k)) Z$$

$$= E[H(f(l_k))Z^H](E[ZZ^H])^{-1} Z$$

In which $E[H(f(l_K))Z^H]$ is the cross-correlation between the channel gain to be predicted and the observation vector, whereas the term $E[ZZ^H]$ is the auto-correlation matrix of the observation vector. In some implementations, the only term that needs to be computed towards an estimate of the channel on frequency tone $f(l_k)$ is the cross-correlation between the true channel on tone $f(l_k)$ and the frequency-domain least-squares channel estimate Z as this is the only term that is a function of the tone of interest $f(l_k)$.

In some implementations, at 520, given the estimate Z across multiple transmission time intervals (TTIs), the auto-correlation matrix of Z, $E[ZZ^H]$, can be computed by sample averaging. Such as, $$E[ZZ^H] \approx \frac{1}{N} \sum_{n=1}^{N} Z_n Z_n^H$$

In a similar manner, the inverse of $E[ZZ^H]$ can be pre-computed based on past observations.

Since $Z(f_p) = H(f_P) + V(f_P)$, auto-correlation matrix of Z can also be computed as follows:

$$E[ZZ^H] = \begin{bmatrix} E[Z(f_1)Z^*(f_1)] & E[Z(f_1)Z^*(f_2)] & \ldots & E[Z(f_1)Z^*(f_P)] \\ E[Z(f_2)Z^*(f_1)] & E[Z(f_2)Z^*(f_2)] & \ldots & E[Z(f_2)Z^*(f_P)] \\ \vdots & \vdots & \ddots & \vdots \\ E[Z(f_P)Z^*(f_1)] & E[Z(f_P)Z^*(f_2)] & \ldots & E[Z(f_P)Z^*(f_P)] \end{bmatrix}$$

In which the (m,n) element of the above matrix can be obtained as:

$$E[Z(f_m)Z^*(f_n)] = E[H(f_m)H^*(f_n)] + E[V(f_m)V^*(f_n)]$$

$$= \sum_{l=1}^{L}\sum_{l'=1}^{L} E[h_l h_{l'}^*] e^{-j2\pi f_m \tau_l} e^{j2\pi f_n \tau_{l'}} + \sigma_V^2 \delta(m-n)$$

$$= \sum_{l=1}^{L} E[|h_l|^2] e^{-j2\pi(f_m - f_n)\tau_l} + \sigma_V^2 \delta(m-n)$$

$$= \rho(f_n - f_m) + \sigma_V^2 \delta(m-n)$$

$$= \rho^*(f_m - f_n) + \sigma_V^2 \delta(m-n)$$

In the above, the function δ( ) evaluates to one when the argument is zero, otherwise it evaluates to zero; $\sigma_v^2$ is noise variance, and ρ is the channel frequency correlation function. Note that the correlation of frequency-domain channel estimate across two distinct tones is only a function of frequency separation between the tones. Also, the second moments of the channel taps, the noise variance, and the tap delay values are needed for the computation of the auto-correlation matrix. Using the above second moments, the auto-correlation function can be simplified as:

$$E[ZZ^H] = \begin{bmatrix} 1+\sigma_n^2 & \rho(f_2-f_1) & \cdots & \rho(f_P-f_1) \\ \rho^*(f_2-f_1) & 1+\sigma_n^2 & \cdots & \rho(f_P-f_2) \\ \vdots & \vdots & \ddots & \vdots \\ \rho^*(f_P-f_1) & \rho^*(f_P-f_2) & \cdots & 1+\sigma_n^2 \end{bmatrix}$$

In some implementations, at 530, the cross-correlation between the channel on the desired tone H(f(l$_k$)) and the frequency-domain least-squares channel estimate Z can be computed. The cross-correlation $E[H(f(l_k))Z^H]$ can be based on the received in-band pilot pulses and correlation coefficients characterizing the out-of-band frequencies (e.g., different frequencies from the received pilot pulses). In some implementations, the cross-correlation can be given by:

$$E[H(f(l_k))Z^H] = [E[H(f(l_k))Z^*(f_1)] \quad E[H(f(l_k))Z^*(f_2)] \quad \cdots \quad E[H(f(l_k))Z^*(f_P)]]$$

$$= [E[H(f(l_k))H^*(f_1)] \quad E[H(f(l_k))H^*(f_2)] \quad \cdots \quad E[H(f(l_k))H^*(f_P)]]$$

$$= \left[\sum_{l=1}^{L} E[|h_l|^2] e^{-j2\pi(f(l_k)-f_1)\tau_l} \quad \cdots \quad \sum_{l=1}^{L} E[|h_l|^2] e^{-j2\pi(f(l_k)-f_P)\tau_l}\right]$$

$$= [\rho(f_1 - f(l_k)) \quad \rho(f_2 - f(l_k)) \quad \cdots \quad \rho(f_P - f(l_k))]$$

In some implementations, the cross-correlation (e.g., as described above) requires the knowledge of the second moments of the tap gains and the tap delays.

The power-delay profile for some selected International Telecommunication Union (ITU) channel models is tabulated in Table 1. If a channel model is known a priori, the correlation coefficients can be pre-computed. For example, the complex-valued frequency-domain channel correlation between tones separated by one resource block (or 12 tones) for an allocation of 10 resource blocks (or 120 tones) is given below in Table 1A for Extended Pedestrian A (EPA), Extended Vehicular A (EVA) and Extended Typical Urban (ETU) channel models. Note that with N frequency tones only N-1 correlations have to be pre-computed for storage purpose.

TABLE 1

Power-Delay Profile for Some ITU Channel Models:

| ITU EPA Channel | | ITU EVA Channel | | ITU ETU Channel | |
|---|---|---|---|---|---|
| Excess Tap Delay (nsec) | Relative Power (dB) | Excess Tap Delay (nsec) | Relative Power (dB) | Excess Tap Delay (nsec) | Relative Power (dB) |
| 0 | 0.0 | 0 | 0.0 | 0 | −1.0 |
| 30 | −1.0 | 30 | −1.5 | 50 | −1.0 |
| 70 | −2.0 | 150 | −1.4 | 120 | −1.0 |
| 90 | −3.0 | 310 | −3.6 | 200 | 0.0 |
| 110 | −8.0 | 370 | −0.6 | 230 | 0.0 |
| 190 | −17.2 | 710 | −9.1 | 500 | 0.0 |
| 410 | −20.8 | 1090 | −7.0 | 1600 | −3.0 |
| | | 1730 | −12.0 | 2300 | −5.0 |
| | | 2510 | −16.9 | 5000 | −7.0 |

TABLE 1A

Example precomputed complex-valued frequency-domain channel correlations between tones separated by one resource block for an allocation of 10 resource blocks:

| EPA | EVA | ETU |
|---|---|---|
| 1.0000 | 1.0000 | 1.0000 |
| 0.9976 + 0.0499i | 0.9011 + 0.2391i | 0.7705 + 0.2659i |
| 0.9904 + 0.0991i | 0.7520 + 0.3400i | 0.6730 + 0.2254i |
| 0.9786 + 0.1469i | 0.6290 + 0.3858i | 0.6178 + 0.3938i |
| 0.9627 + 0.1929i | 0.5254 + 0.4071i | 0.4198 + 0.4746i |
| 0.9430 + 0.2367i | 0.4155 + 0.4167i | 0.2403 + 0.5026i |
| 0.9200 + 0.2781i | 0.3106 + 0.3955i | 0.1245 + 0.3474i |
| 0.8942 + 0.3168i | 0.1846 + 0.3474i | 0.2711 + 0.3505i |
| 0.8657 + 0.3529i | 0.1046 + 0.1897i | 0.1159 + 0.4479i |
| 0.8348 + 0.3863i | 0.1677 + 0.0653i | 0.1058 + 0.2103i |

At 540, in some implementations, once the auto-correlation $E[ZZ^H]$ and cross-correlation vector $E[H(f(l_k))Z^H]$ are computed, either using stored frequency correlation values, or using the prior knowledge of the channel type, an estimate of the channel on frequency tone f(l$_k$) can be given by:

$$\hat{H}(f(l_k)) = E[H(f(l_k))Z^H](E[ZZ^H])^{-1}Z$$

At 550, the instantaneous and/or average CQI can be computed. The instantaneous channel quality on frequency tone f(l$_k$) can be given by:

$$CQI(f(l_k)) = |\hat{H}(f(l_k))|^2 = |E[H(f(l_k))Z^H](E[ZZ^H])^{-1}Z|^2$$

The average channel quality on frequency tone f(l$_k$) can be given by:

$$\begin{aligned}
\text{CQI\_Avg}(f(l_k)) &= E\left[|\hat{H}(f(l_k))|^2\right] \\
&= E[H(f(l_k))Z^H](E[ZZ^H])^{-1}E[ZZ^H](E[ZZ^H])^{-1}E[H(f(l_k))Z^H]^H \\
&= E[H(f(l_k))Z^H](E[ZZ^H])^{-1}E[H(f(l_k))Z^H]^H \\
&= [\rho(f_1 - f(l_k))\ \rho(f_2 - f(l_k))\ \ldots\ \rho(f_P - f(l_k))] \times \\
&\begin{bmatrix} 1+\sigma_n^2 & \rho(f_2 - f_1) & \ldots & \rho(f_P - f_1) \\ \rho^*(f_2 - f_1) & 1+\sigma_n^2 & \ldots & \rho(f_P - f_2) \\ \vdots & \vdots & \ddots & \vdots \\ \rho^*(f_P - f_1) & \rho^*(f_P - f_2) & \ldots & 1+\sigma_n^2 \end{bmatrix} \begin{bmatrix} \rho^*(f_1 - f(l_k)) \\ \rho^*(f_2 - f(l_k)) \\ \vdots \\ \rho^*(f_P - f(l_k)) \end{bmatrix}
\end{aligned}$$

As described, the average CQI on frequency tone $f(l_k)$ is only a function of allocation size, and the correlation coefficients $\rho$, but is not a function of the frequency-domain least-squares channel estimate Z. The consequence of this observation is that average channel quality information can be obtained very efficiently just based on the allocation information and the stored (or pre-computed) correlation values, without actually having access to the frequency-domain channel estimates on pilot tones.

Figure 6:
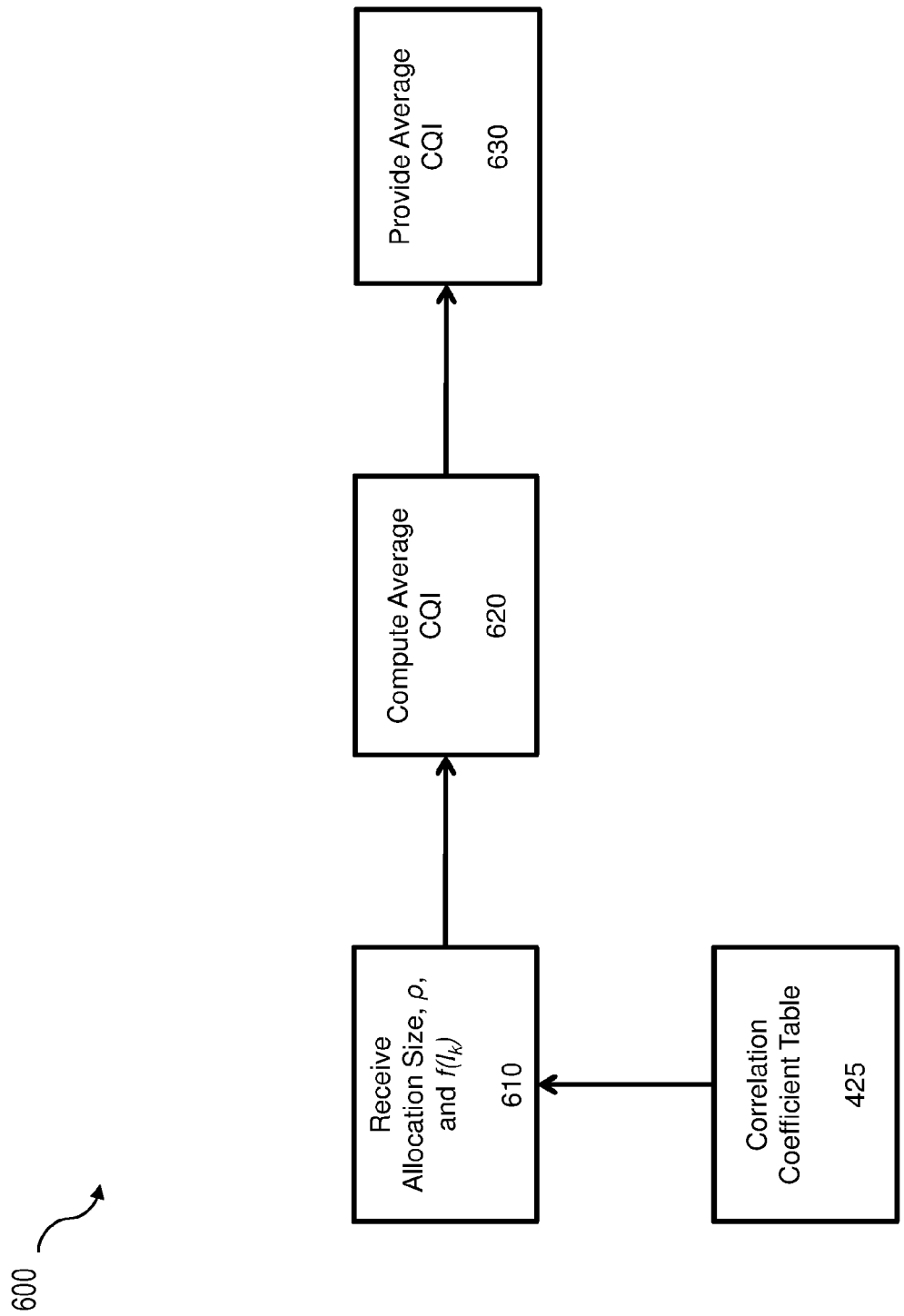
FIG. 6 is a functional block diagram illustrating a process to compute average CQI.

For example, FIG. 6 is a functional block diagram illustrating a process 600 to compute average CQI. At 610, one or more given frequencies $f(l_k)$, allocation size, and correlation coefficients $\rho$ are received. Correlation coefficients can be received from and stored in correlation table 425. At 620, an average CQI can be computed for the given frequencies $f(l_k)$ using the correlation coefficients $\rho$ and allocation size. And at 630, the average CQI can be provided, for example, to a scheduler or RRM. Providing can include storing, transmitting, and further processing.

In some implementations, the number of correlation coefficients can be less than one per subcarrier frequency. In some implementations, the average and instantaneous CQI can be estimated autonomously once per frequency tone. The number of complex-valued correlation coefficients to be stored with this approach is N-1 for a system with N frequency tones. As an example, for the 3GPP LTE system operating over 20 MHz channel bandwidth, the number of frequency tones is N=1200, and one needs to store as many as 1199 complex-valued correlation coefficients. But the storage requirements of correlation coefficients can be reduced while significantly improving the noise robustness of estimated CQI.

Since the number of channel taps can be much smaller than the number of subcarriers (comparing the number of channel taps in Table 1 against the number of subcarriers in Table 2) for all the channel bandwidths, the channel can be correlated in frequency domain across adjacent sub-carriers. Because the channel can be correlated in frequency across adjacent sub-carriers, the number of correlations to be stored can be reduced.

Since a resource block in LTE is comprised of 12 consecutive sub-carriers, averaging the frequency-domain least-squares channel estimates over blocks of Q subcarriers within a resource block (RB) is possible. For example, if Q=6, there are effectively two estimates per RB, whereas by choosing Q=12, there is one estimate per RB. Since the original subcarrier spacing is $\Delta f$, after averaging over a block of Q subcarriers, the sub-carrier spacing can be increased to $Q\Delta f$.

Starting with the frequency-domain least squares channel estimates on pilot tones within the allocation Z, the effective channel estimate after averaging over Q consecutive sub-carriers can be given by:

$$Z_Q(p) = \frac{1}{Q}\sum_{q=1}^{Q} Z((p-1)Q + q)\quad p = 1, 2, \ldots, \frac{P}{Q}$$

The noise variance of $Z_Q(p)$ is now reduced by Q times. Instead of using the frequency domain least squares (FDLS) channel estimates Z(p), p=1, 2, . . . , P, $Z_Q(p)$ can be used for autonomous prediction of CQI. The CQI estimate based on $Z_Q(p)$ can be given by:

$$\text{CQI}_Q(f(l_k)) = |\hat{H}(f(l_k))|^2 = |E[H(f(l_k))Z_Q^H]\\ (E[Z_Q Z_Q^H])^{-1}Z_Q|^2$$

The size of $Z_Q$ is $(Q/P) \times 1$. Also, the frequency tones $f(l_k)$ are separated by $Q\Delta f$. As a result, the complex-valued correlation coefficients can be given by:

$$\rho_Q(f_n - f_m) = \sum_{l=1}^{L} E[|h_l|^2]e^{-j2\pi Q\Delta f(m-n)\tau_l}$$

The subject matter described herein provides many advantages. For example, the current subject matter reduces the number of complex-valued correlations to be stored from N-1 to (N/Q)-1. For various LTE system bandwidths, ranging from 1.4 MHz to 20 MHz, the number of correlations to be stored is tabulated in Table 2 for Q=1, Q=6 and Q=12.

TABLE 1

Number of complex-valued correlation coefficients need to be stored for some example 3GPP LTE systems:

| System Bandwidth (MHz) | Number of Resource Blocks | Number of Sub-Carriers | Number of Correlations (with Q = 1) | Number of Correlations (with Q = 4) | Number of Correlations (with Q = 6) | Number of Correlations (with Q = 12) |
|---|---|---|---|---|---|---|
| 1.4 | 6 | 72 | 71 | 17 | 11 | 5 |
| 3 | 15 | 180 | 179 | 44 | 29 | 14 |

TABLE 1-continued

Number of complex-valued correlation coefficients need to be
stored for some example 3GPP LTE systems:

| System Bandwidth (MHz) | Number of Resource Blocks | Number of Sub-Carriers | Number of Correlations (with Q = 1) | Number of Correlations (with Q = 4) | Number of Correlations (with Q = 6) | Number of Correlations (with Q = 12) |
|---|---|---|---|---|---|---|
| 5 | 25 | 300 | 299 | 74 | 49 | 24 |
| 10 | 50 | 600 | 599 | 149 | 99 | 49 |
| 15 | 75 | 900 | 899 | 224 | 149 | 74 |
| 20 | 100 | 1200 | 1199 | 299 | 199 | 99 |

CQI prediction can be performed in the case of multiple receiver antennas as follows. With M receiver antennas, the channel from the transmit antenna to the m-th receiver antenna can be given by:

$$h_m(\tau) = \sum_{l=1}^{L} h_{l,m}\delta(\tau - \tau_l)$$

In which m is the receiver antenna index. The corresponding channel frequency response can be denoted by:

$$H_m(f) = \sum_{l=1}^{L} h_{l,m}e^{-j2\pi f \tau_l}$$

With an averaging parameter of Q consecutive subcarriers, the effective channel estimate on m-th receiver antenna can be given by:

$$Z_Q^m(p) = \frac{1}{Q}\sum_{q=1}^{Q} Z_m((p-1)Q+q) \quad p = 1, 2, \ldots, \frac{P}{Q}$$

where, now, $Z_m(p)$ is the FDLS channel estimate on tone $f_p$ and on receiver antenna m.

The CQI estimate on antenna m based on $Z_Q^m(p)$ can be given by:

$$CQI_Q^m(f(l_k)) = |\hat{H}_Q^m(f(l_k))|^2 = |E[H(f(l_k))Z_Q^{m,H}]$$
$$(E[Z_Q^m Z_Q^{m,H}])^{-1} Z_Q^m|^2$$

In which $$Z_Q^m = \left[Z_Q^m(1) \ldots Z_Q^m\left(\frac{P}{Q}\right)\right]^T.$$

The CQI averaged over all the receiver antennas can be given by:

$$CQI_Q(f(l_k)) = \frac{1}{M}\sum_{m=1}^{M} CQI_Q^m(f(l_k))$$

The current subject matter can be extended to multiple transmitter antennas. In 3GPP LTE (e.g., releases 8 and 9), the following reference signals are available in the downlink for channel estimation and equalization at the user equipment. Specifically, cell-specific reference signals, MBSFN reference signals, user-specific reference signals, and positioning reference signals.

Additionally, some LTE-Advanced systems have CSI reference signals to allow the UEs to estimate channel state information. When an antenna port transmits a reference signal on a particular OFDM symbol on a given subcarrier (e.g., on a given resource element), the remaining antenna ports do not transmit any signal on the same resource element. With this, the UE can estimate the downlink channel once per transmit antenna port, and CQI prediction schemes, for example, as described above, can be applied in a straightforward manner once per transmitter antenna to estimate the instantaneous and average MIMO channel gains over a pre-selected signal bandwidth.

Figure 9A:
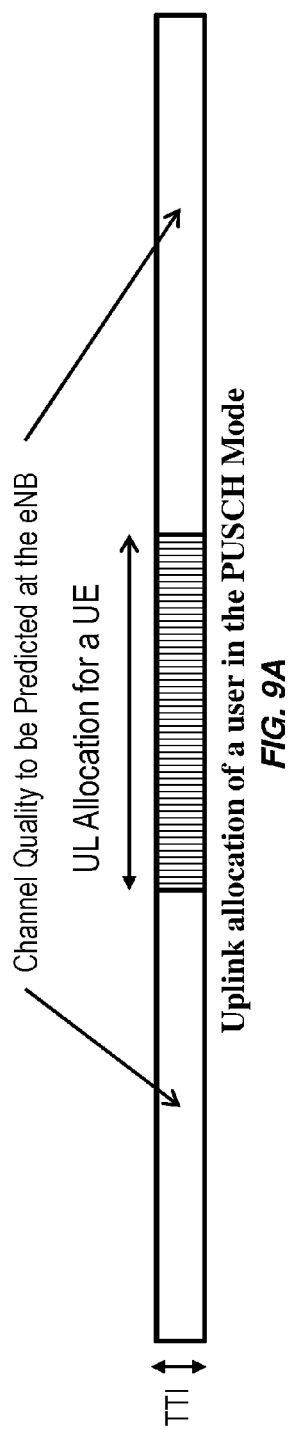
FIGS. 9A-9C illustrate sub-band allocations for a user during physical uplink shared channel, physical uplink control channel, and physical downlink shared channel/physical downlink control channel, respectively.
Figure 9B:
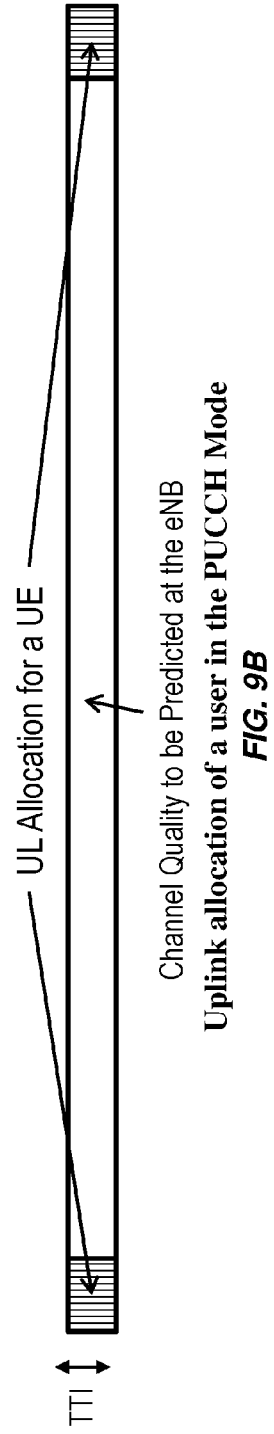
Figure 9C:
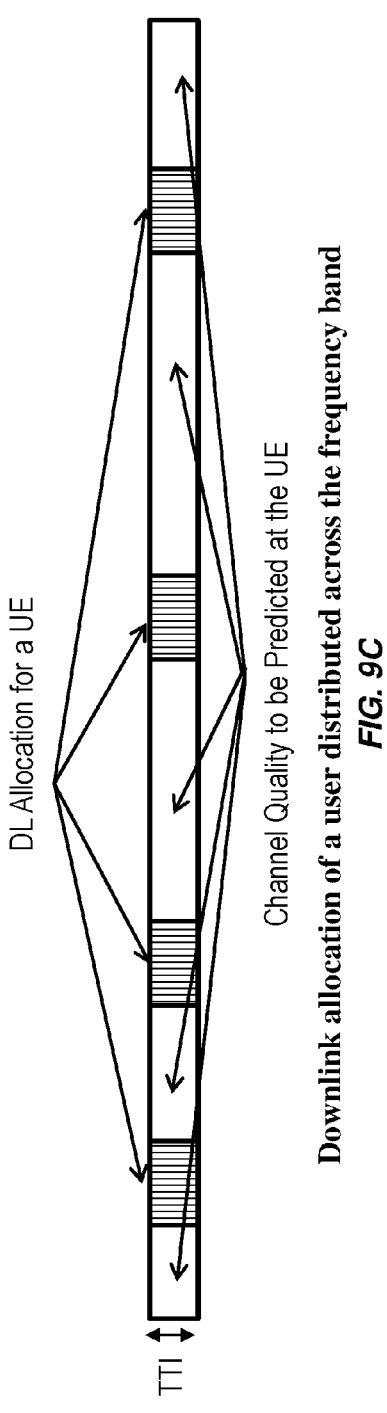

By way of illustration FIGS. 9A-9C illustrate sub-band allocations for a user during physical uplink shared channel (PUSCH), physical uplink control channel (PUCCH), and physical downlink shared channel (PDSCH)/physical downlink control channel (PDCCH), respectively. Useful bandwidth for transmission (either in the uplink or downlink) is illustrated in the horizontal axis; whereas time is illustrated in the vertical axis (one TTI is illustrated). Data transmission, including pilot pulse sequences can be transmitted on the allocated bandwidth (e.g., the in-band frequencies). Using the current subject matter, channel quality prediction can occur autonomously at the non-allocated frequencies (e.g., the out-of-band frequencies).

Figure 10:
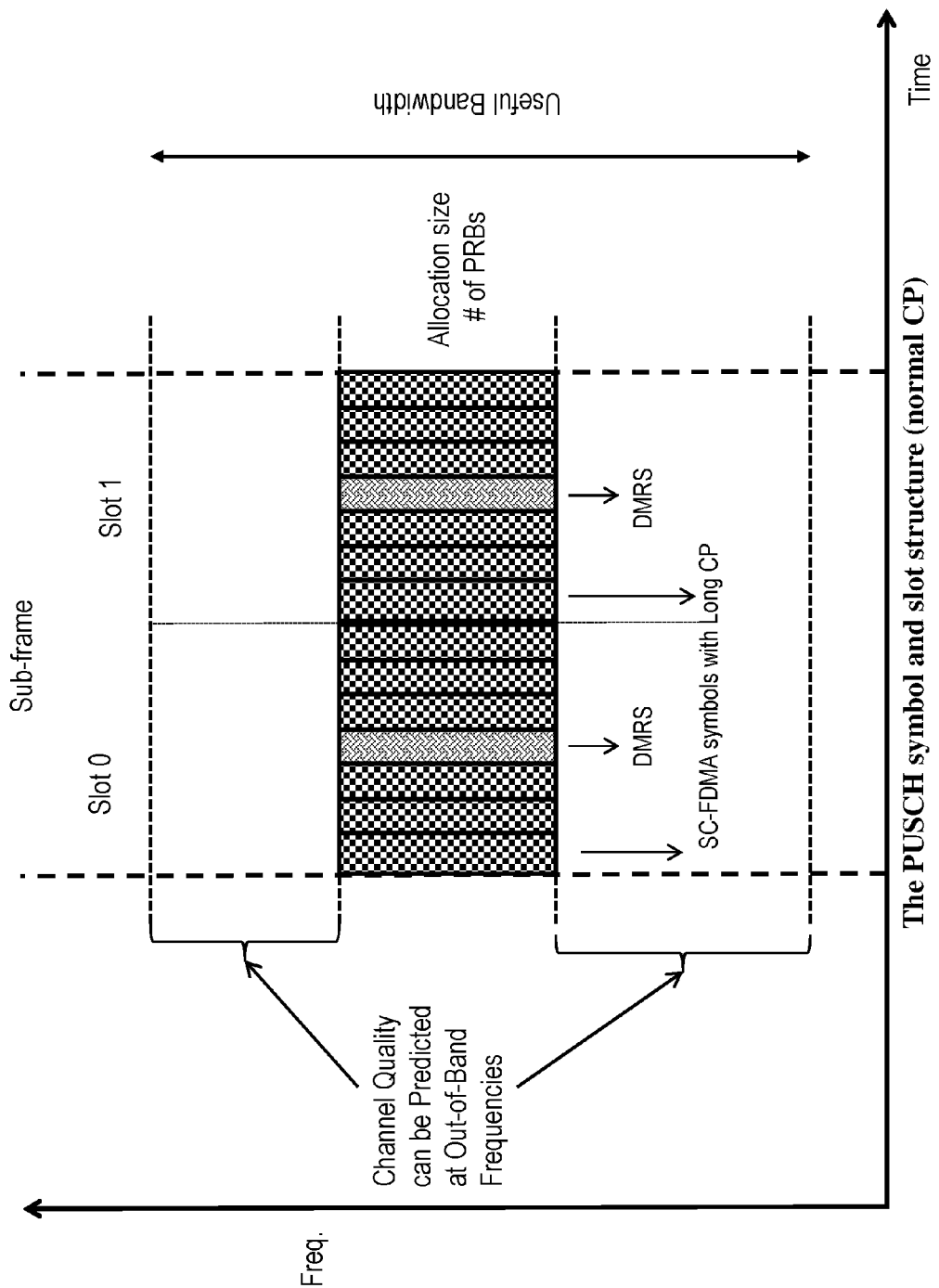
FIG. 10 is a plot of frequency and time illustrating the physical uplink shared channel symbol and slot structure for a normal cyclic-prefix (CP)
Figure 11:
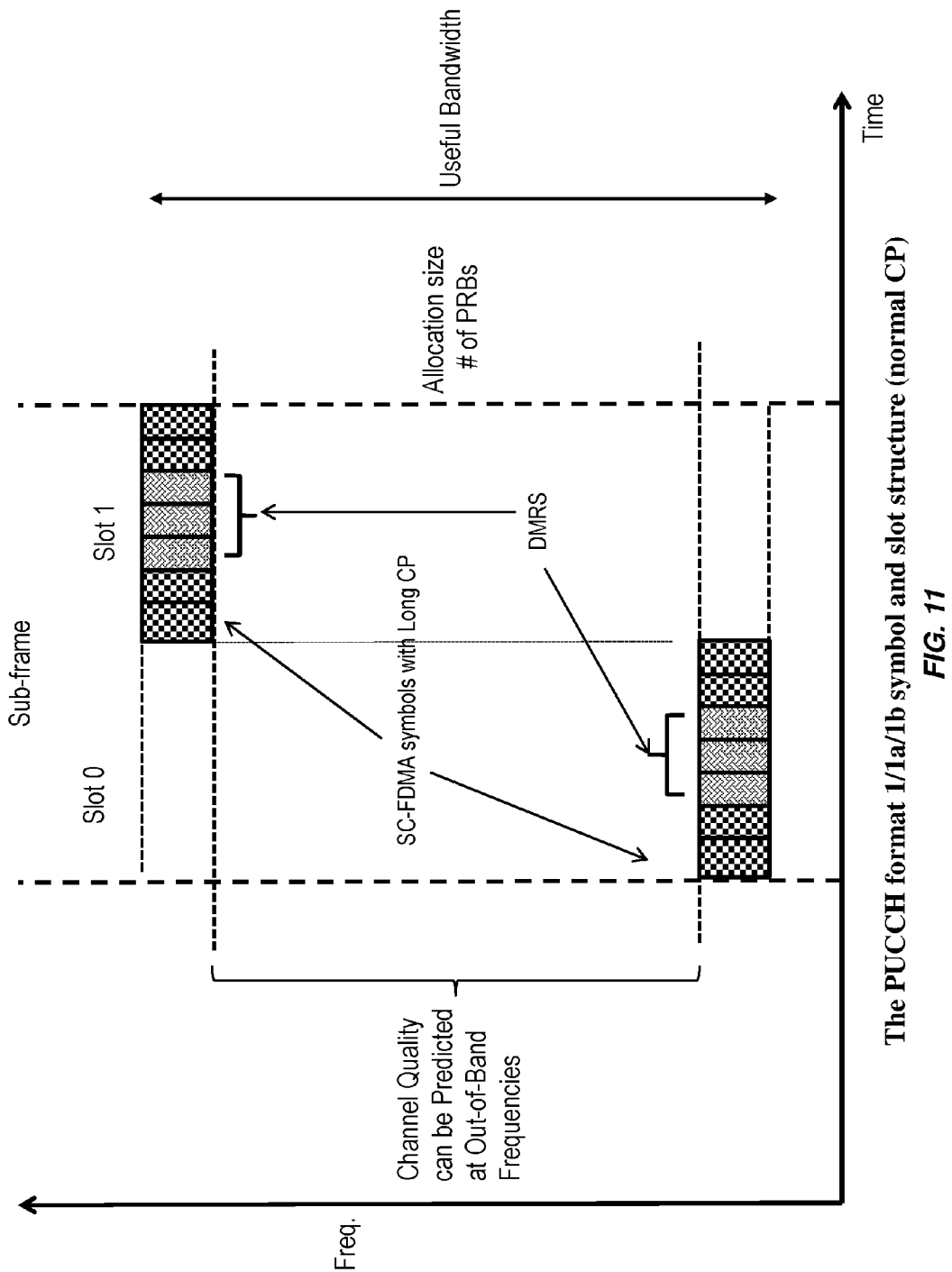
FIG. 11 is a plot of frequency and time illustrating a physical uplink control channel format symbol and slot structure for a normal CP.
Figure 12:
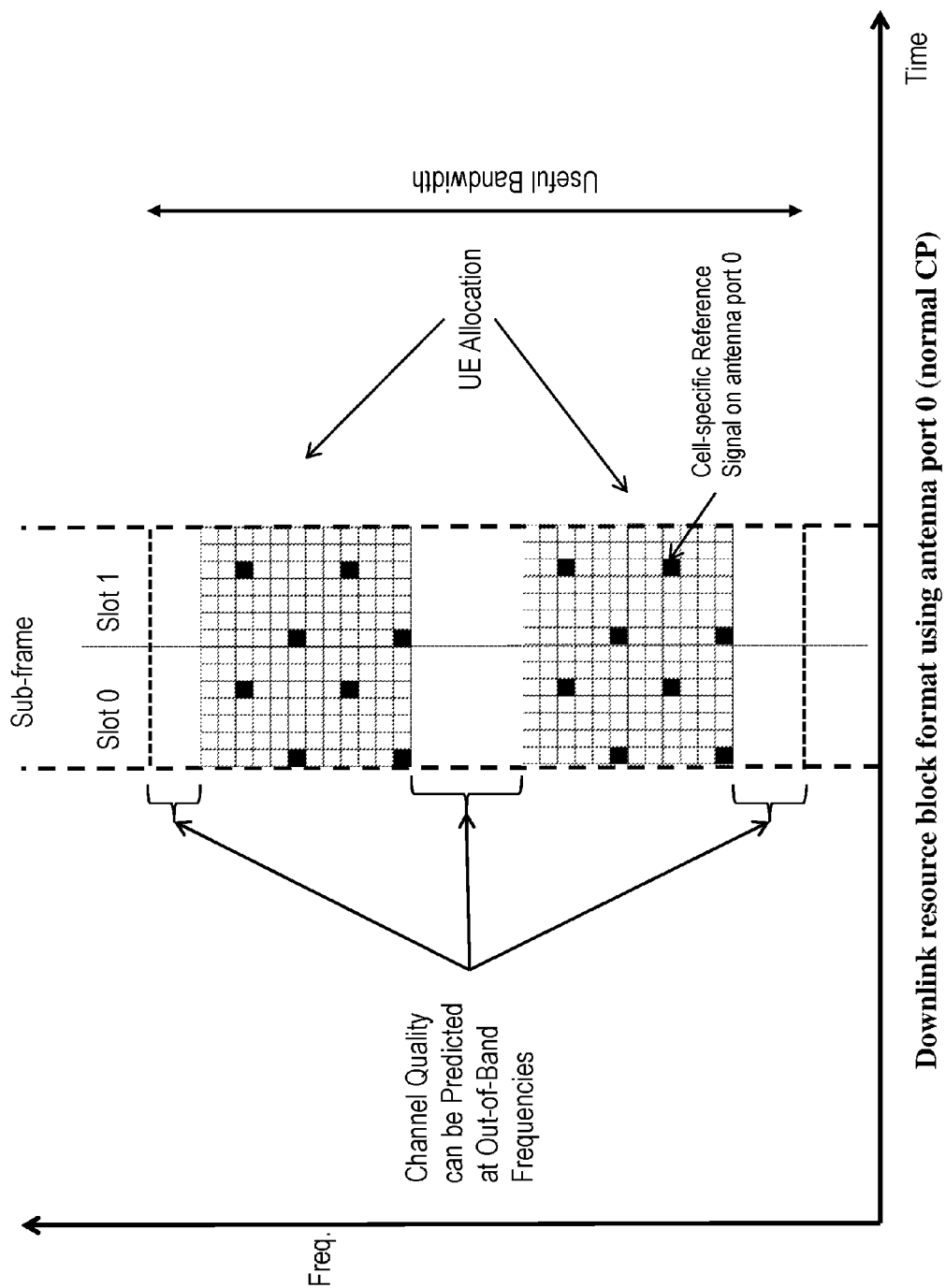
FIG. 12 is a plot illustrating the symbol and slot structure for the downlink resource blocks with antenna port 0.

By way of illustration the LTE data channel (PUSCH) has a single demodulation reference symbol (DMRS) within a slot of seven symbols for normal CP (or six symbols for extended CP), as shown in FIG. 10. Channel quality prediction can occur at frequencies outside the UE uplink allocation using, for example, the DMRS. As a second example, the symbol and slot structure for an uplink control channel (PUCCH) format is depicted in FIG. 11. Here, the PUCCH allocations are made towards the edges of the RB allocations, and prediction of channel quality can be performed at frequencies between the PUCCH allocations. In a similar manner, in FIG. 12 the downlink reference signal structure is detailed for normal CP with one antenna port. Here, in each slot of seven OFDM symbols, there are four reference signals available. Channel quality prediction can occur between and outside of UE allocations.

For uplink communication with eNodeB in LTE systems, a UE can employ either a PUSCH or PUCCH physical channel. In the absence of any user data and/or significant uplink control information, PUCCH can be used. PUCCH allocations occupy the edge of the transmission bandwidth. PUSCH can be used to transmit user payload data. The PUSCH allocation can be contiguous in frequency. For uplink link adaptation and power control, the eNodeB can require the uplink CQI of a given UE. This CQI can be generated directly at the eNodeB based on the demodulation reference signals (DMRS) present in PUSCH or PUCCH. The estimated CQI at eNodeB based on DMRS may be valid only within the PUSCH/PUCCH allocation. For example, if the PUSCH allocation is 1 resource block (RB), then the estimated CQI may correspond to only this RB size, and the CQI information for this UE may not be available for the remaining RBs. In a similar manner, the CQI based on PUCCH may be valid only for cell-edge RBs, and the CQI on non-cell-edge RBs may not be available for this UE.

For downlink communication with UEs in LTE systems, the eNodeB can employ a variety of physical channels. The PBCH (physical broadcast channel) can carry master information block (MIB)

The subject matter described herein provides many advantages. For example, it is a usual practice that the transmitter sends pilot symbols, allowing the receiver to estimate the channel, compute various channel quality metrics, and feedback the estimated CQI via a dedicated channel to the transmitter. This approach incurs significant over-the-air resource consumption, and hence is inherently inefficient. The current subject matter can eliminate the requirement to feedback this CQI, as the CQI is computed autonomously using the signals received at the transmitting node when it is in receive mode, thereby significantly improving the over-the-air resource utilization. Moreover, uplink control channel overhead can be reduced significantly, and thereby improving the uplink spectral efficiency. The eNodeB can use the derived CQI to control the MCS parameters, transmit power, and MIMO mode adaptation of UEs it serves.

As another example, the current subject matter can provide for each pair of transmitter and receiver antennas, an estimate of the instantaneous CQI of each UE that is currently served by the eNodeB; for each pair of transmitter and receiver antennas, an estimate of the average CQI of each UE that is currently served by the eNodeB; an estimate of the instantaneous CQI, aggregated over the receiver antennas, of each UE that is currently served by the eNodeB; and an estimate of the average CQI, aggregated over the receiver antennas, of each UE that is currently served by the eNodeB.

As another example, the current subject matter can enable OFDM and SC-FDMA based MIMO wireless systems to support a large number of users with dissimilar channel conditions and data rate requirements. The current subject matter can overcome the adverse effects of wireless propagation and other-user interference by enabling base-stations to employ adaptive transmission techniques wherein the transmission power, modulation and coding schemes (MCS), and MIMO transmission modes are dynamically varied based on predicted channel and interference conditions to support a certain target bit rate.

As another example, the current subject matter can enable adapting the downlink transmission power, MCS and MIMO transmission modes based on predicted downlink channel quality information. Since the number of available resource blocks increases with the amount and frequency of reported CQI, substantial overhead is avoided by not sending the CQI reports from the UE to the eNodeB, which would otherwise significantly reduce the supported uplink user data rate and the number of users.

Additionally, the current subject matter can enable prediction of a potential radio link failure (RLF) condition at the UE. If the predicted CQI is very low, the UE might experience RLF condition, and, as a result, an early handover event can be initiated.

Figure 7:
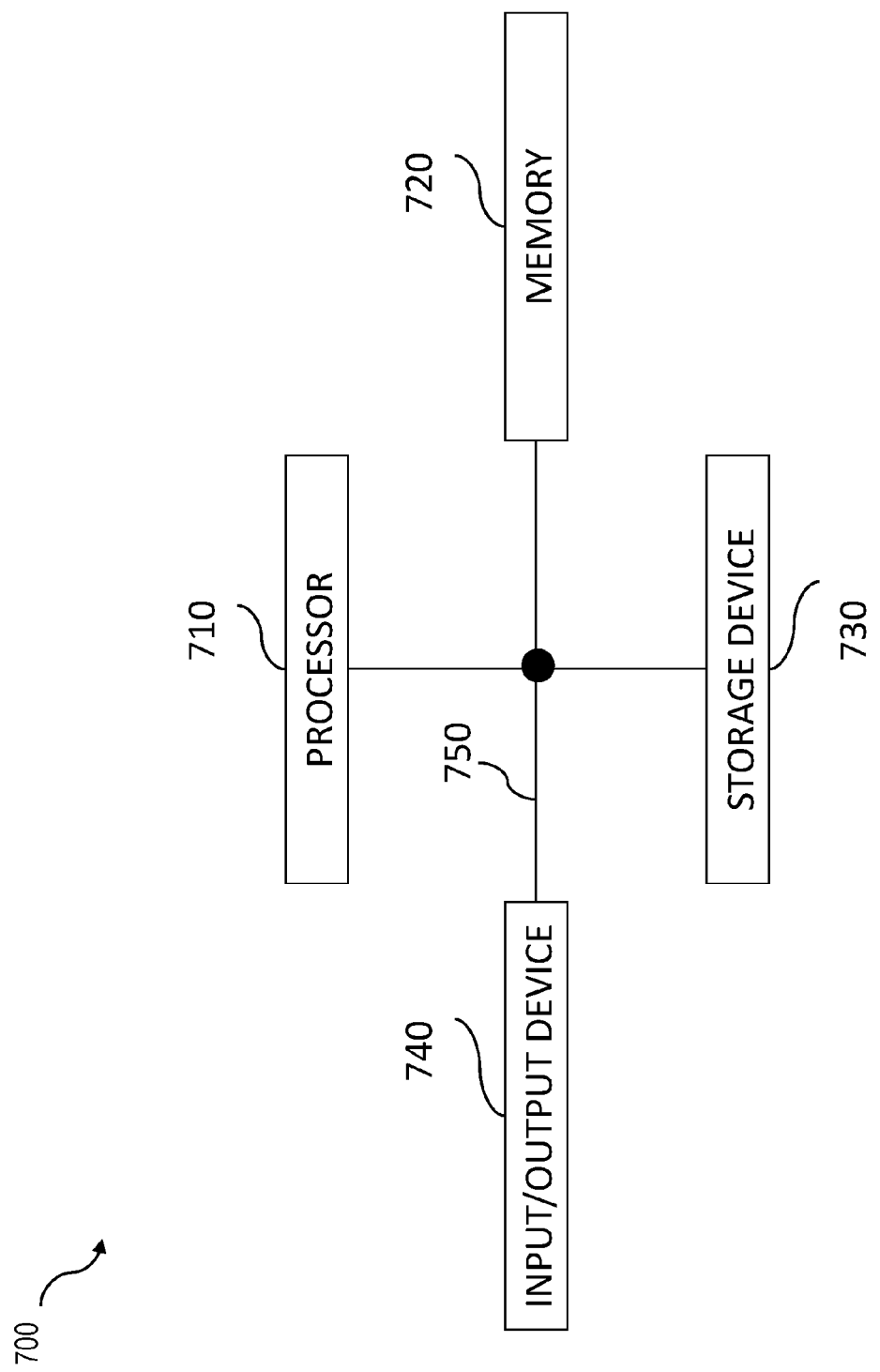
FIG. 7 is an example implementation of a computing system.

In some implementations, the current subject matter can be configured to be implemented in a system 700, as shown in FIG. 7. The system 700 can include one or more of a processor 710, a memory 720, a storage device 730, and an input/output device 740. Each of the components 710, 720, 730 and 740 can be interconnected using a system bus 750. The processor 710 can be configured to process instructions for execution within the system 700. In some implementations, the processor 710 can be a single-threaded processor. In alternate implementations, the processor 710 can be a multi-threaded processor. The processor 710 can be further configured to process instructions stored in the memory 720 or on the storage device 730, including receiving or sending information through the input/output device 740. The memory 720 can store information within the system 700. In some implementations, the memory 720 can be a computer-readable medium. In alternate implementations, the memory 720 can be a volatile memory unit. In yet some implementations, the memory 720 can be a non-volatile memory unit. The storage device 730 can be capable of providing mass storage for the system 700. In some implementations, the storage device 730 can be a computer-readable medium. In alternate implementations, the storage device 730 can be a floppy disk device, a hard disk device, an optical disk device, a tape device, non-volatile solid state memory, or any other type of storage device. The input/output device 740 can be configured to provide input/output operations for the system 700. In some implementations, the input/output device 740 can include a keyboard and/or pointing device. In alternate implementations, the input/output device 740 can include a display unit for displaying graphical user interfaces.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A method for implementation by one or more data processors forming part of at least one computing system, the method comprising:
   receiving, by at least one data processor associated with a transceiver, data characterizing a first signal transmitted in an orthogonal frequency-division multiplexing (OFDM) system by a transmitter with one or more transmit antennas through an in-band channel and received by a receiver of the transceiver and with a plurality of receive antennas, the first signal comprising one or more in-band pilot pulses;
   predicting, using at least one data processor and when the transceiver is in receive mode, a channel quality for an out-of-band channel based on the received data and a cross-correlation between an in-band channel and one or more out-of-band channels, the channel quality prediction used by the transceiver in transmit mode to transmit data over the out-of-band channel; and
   providing, using at least one data processor, data characterizing the predicted channel quality for the out-of-band channel.

2. The method of claim 1, wherein the cross-correlation is pre-computed using a predetermined channel model.

3. The method of claim 1, further comprising computing the cross-correlation based on prior knowledge of a type of channel model associated with the out-of-band channel.

4. The method of claim 1, wherein the out-of-band channel is within a usable transmission bandwidth.

5. The method of claim 1, wherein the cross-correlation is characterized by a plurality of stored correlation coefficients, each correlation coefficient corresponding to an average of two or more subcarrier channel estimates.

6. The method of claim 1, wherein the channel quality is predicted at least once per transmitter antenna.

7. A non-transitory computer program product storing instructions, which when executed by at least one data processor of at least one computing system, implement a method comprising:

receiving, by at least one data processor associated with a transceiver, data characterizing a first signal transmitted in an orthogonal frequency-division multiplexing (OFDM) system by a transmitter with one or more transmit antennas through an in-band channel and received by a receiver of the transceiver and with a plurality of receive antennas, the first signal comprising one or more in-band pilot pulses;

predicting, using at least one data processor and when the transceiver is in receive mode, a channel quality for an out-of-band channel based on the received data and a cross-correlation between an in-band channel and one or more out-of-band channels, the channel quality prediction used by the transceiver in transmit mode to transmit data over the out-of-band channel; and providing, using at least one data processor, data characterizing the predicted channel quality for the out-of-band channel.

8. The non-transitory computer program product of claim 7, wherein the cross-correlation is pre-computed using a predetermined channel model.

9. The non-transitory computer program product of claim 7, the method further comprising computing the cross-correlation based on prior knowledge of a type of channel model associated with the out-of-band channel.

10. The non-transitory computer program product of claim 7, wherein the out-of-band channel is within a usable transmission bandwidth.

11. The non-transitory computer program product of claim 7, wherein the cross-correlation is characterized by a plurality of stored correlation coefficients, each correlation coefficient corresponding to an average of two or more subcarrier channel estimates.

12. The non-transitory computer program product of claim 7, wherein the channel quality is predicted at least once per transmitter antenna.

13. A system comprising:
at least one data processor;
memory storing instructions which, when executed by the at least one data processor, causes the at least one data processor to perform operations comprising:

receiving, by at least one data processor associated with a transceiver, data characterizing a first signal transmitted in an orthogonal frequency-division multiplexing (OFDM) system by a transmitter with one or more transmit antennas through an in-band channel and received by a receiver of the transceiver and with a plurality of receive antennas, the first signal comprising one or more in-band pilot pulses;

predicting, using at least one data processor and when the transceiver is in receive mode, a channel quality for an out-of-band channel based on the received data and a cross-correlation between an in-band channel and one or more out-of-band channels, the channel quality prediction used by the transceiver in transmit mode to transmit data over the out-of-band channel; and providing, using at least one data processor, data characterizing the predicted channel quality for the out-of-band channel.

14. The system of claim 13, wherein the cross-correlation is pre-computed using a predetermined channel model.

15. The system of claim 13, the operations further comprising computing the cross-correlation based on prior knowledge of a type of channel model associated with the out-of-band channel.

16. The system of claim 13, wherein the out-of-band channel is within a usable transmission bandwidth.

17. The system of claim 13, wherein the cross-correlation is characterized by a plurality of stored correlation coefficients, each correlation coefficient corresponding to an average of two or more subcarrier channel estimates.

18. The system of claim 13, wherein the channel quality is predicted at least once per transmitter antenna.

* * * * *